United States Patent [19]

Gassman et al.

[11] Patent Number: 4,509,403

[45] Date of Patent: Apr. 9, 1985

[54] POSITIONER HAVING USER-ADJUSTABLE DYNAMIC RESPONSE

[75] Inventors: George W. Gassman; Gerald F. Varnum, both of Marshalltown, Iowa

[73] Assignee: Fisher Controls International, Inc., Marshalltown, Iowa

[21] Appl. No.: 371,331

[22] Filed: Apr. 23, 1982

[51] Int. Cl.³ .................................................. F15B 13/16
[52] U.S. Cl. ........................................ 91/365; 91/387; 137/84
[58] Field of Search ............... 137/82, 84, 85; 91/365, 91/387, 388, 385, 386

[56] References Cited

U.S. PATENT DOCUMENTS

| | | | |
|---|---|---|---|
| 2,053,797 | 9/1936 | King | 91/365 |
| 2,484,557 | 10/1949 | Eckman | 91/385 |
| 2,536,198 | 1/1951 | Matner et al. | 137/84 |
| 2,789,543 | 4/1957 | Popowsky | 91/365 |
| 2,793,540 | 5/1957 | Cronk | 74/522 |
| 2,989,950 | 6/1961 | Lockman | 91/388 |
| 3,003,475 | 10/1961 | Rouvalis | 91/387 |
| 3,084,550 | 4/1963 | Bowditeh | 91/387 |
| 3,101,031 | 8/1963 | Crossley, Jr. | 91/387 |
| 3,101,650 | 8/1963 | Blanton | 91/433 |
| 3,565,391 | 2/1971 | Zannini | 251/28 |
| 3,693,501 | 9/1972 | Ward et al. | 91/387 |
| 3,915,062 | 10/1975 | Westfall et al. | 91/387 |

FOREIGN PATENT DOCUMENTS

| | | | |
|---|---|---|---|
| 268651 | 9/1950 | Switzerland | 91/365 |
| 1140585 | 1/1969 | United Kingdom . | |

Primary Examiner—Paul E. Maslousky
Attorney, Agent, or Firm—Dale A. Kubly; Nicholas A. Camasto

[57] ABSTRACT

A positioner-actuator control system includes a pair of relays and a pivotally mounted beam for operation thereof in response to a pneumatic control signal. A summing beam has forces applied to it from an input signal, a controlled device position lever, a zero adjustment and a damping mechanism comprising a pair of flat springs attached to the relay beam and to the summing beam. A clamp is movable along the flat springs to permit user adjustment of the damping force.

12 Claims, 9 Drawing Figures

POSITIONER HAVING USER-ADJUSTABLE DYNAMIC RESPONSE

FIELD OF THE INVENTION

This invention relates generally to positioner systems for determining the position of a controlled device in response to an input signal and specifically to a positioner system having a user-adjustable dynamic response.

BACKGROUND OF THE INVENTION AND PRIOR ART

Systems are well-known in the art, for use in conjunction with actuator mechanisms, for controlling movement of a valve stem, for example, in response to an input signal or condition. Such systems are usually pneumatic, using compressed air to effect both the control functions and movement of the valve stem. It is common to use a pneumatic relay for a single acting actuator mechanism or a pair of pneumatic relays for a double acting actuator mechanisms. The actuator includes a piston which in turn is coupled to the control device, usually a valve stem, for movement thereof in accordance with the position of the piston. A feedback of information about the position of the controlled device is made to the positioner to verify that the position determined by the input signal or condition has been reached.

Generally, the input signal is converted to a force and applied to a summing means, sometimes referred to as a summing beam or balance beam, which is movable to modulate a nozzle pressure that is used as a command signal for the pneumatic relays. The information as to the position of the controlled device is also converted to a force and applied to the summing means. The summing means is statically balanced by a zero adjustment force and, when the positioner is in equilibrium, the relays are closed and the system is at rest. In practice, the relays usually allow line pressure to act on both sides of the actuator piston, even during equilibrium. The operation of such positioner-actuator systems is well known in the art. Needless to say there is a myriad of design parameters to be considered and many compromises are required because of the need to satisfy a very wide range of actuators and controlled devices.

For example, it is well known that controlling the valve stem position of a small volume actuator mechanism presents an entirely different set of problems than controlling the valve stem position of a large volume actuator mechanism by means of a correspondingly larger actuator mechanism. That is, typical small volume actuators exhibit greater underdamped stem response than large volume actuators due to the smaller volumes which must be changed to effect positioning. When one considers the attributes the positioner must have, such as static positioning accuracy, response time, dynamic stability, and adaptability for the user-in conjunction with cost constraints-the need for positioners capable of good performance over a wide range of operating conditions is readily perceived.

There are many feedback arrangements for indicating the position of the movable element in the controlled device to the summing beam. This type feedback is often referred to as major loop feedback and is sufficient for a great number of designs operating with single-acting diaphragm actuators. However, major loop feedback is insufficient for double-acting actuators having air pressure applied to both sides of a piston which is moved by the pressure differential. Such actuators have required additional feedback, sometimes referred to as minor loop feedback in the positioner to prevent overtravel of the actuator piston yet provide reasonable "crisp" response, that is good response time. The minor loop feeback is negative and may be considered a damping means.

Obviously, if a positioner is designed for use with a particular actuator and controlled device the system can be critically damped and not require any additional feedback or damping. Thus a single-use positioner-actuator system can readily be "tailored" for optimum performance. Realistically, this is an unrealized situation as the cost is prohibitive. Faced with this dilemma, designers make the units to perform adequately based upon "worst case" conditions. In the positioner art that means for use with a small actuator. The low volume of the actuator mechanism makes it susceptible to "overshooting" and going into an oscillatory mode should a reasonably fast response time be demanded. Use of such a positioner with a "heavier" actuator involves substantial performance degradation. Consequently there are many drawbacks to systems presently available because of these cost-performance tradeoffs.

U.S. Pat. No. 3,565,391 discloses a pneumatic valve positioner having minor loop feedback for providing dynamic stabilization between an air relay and a balance beam (summing beam). The valve positioner conventionally operates to command a part (controlled device) to undertake a mechanical motion or excursion in response to an input signal in the form of a gas supplied at a certain signal pressure. An output signal is sent in response to the actual pressure of the received signal to cause the desired motion to occur. The controlled device, in moving, mechanically relocates a reference point which feeds back a signal confirming that the motion has indeed occurred. (This is the major feedback referred to above). The command signal is conventionally generated by a nozzle flapper arrangement which is responsive to the input signal, the output signal, and the feedback signal. The patent attempts to solve the problem of fast response time without overshoot while retaining resolution sensitivity and stability by using a three point balance beam, with one point being controlled by the input signal, another by the output signal, and a third responsive to a feedback signal from the controlled device. The patent thus discloses a conventional summing beam with input signal and a major loop feedback signal indicative of controlled device position and a fixed minor loop feedback ratio, or gain, from the output relay back to the summing beam. The minor loop feedback has a damping effect on the summing beam and the three point system is said to achieve dynamic stability.

The patented system and other prior art systems satisfy definite needs in the art. The system of the invention however, as will be seen, goes well beyond prior art systems and provides the user with a positioner-system that is field-adjustable for optimizing performance with a wide range of actuator types. With the system of the invention the problem of prior art systems because of "worst case" design criteria using a small actuator and actual field conditions using substantially larger actuators, is effectively overcome. With a single system the user may "dynamically tune" the positioner of the invention to produce a "crisp" response without overshoot. Finally, this improvement in performance is accomplished in a very economical and cost-effective manner.

SUMMARY OF THE INVENTION

Thus, an object of the invention is to provide a novel positioner system for controlling the position of a controlled device.

Another object of the invention is to provide a user-adjustable positioner system for tailoring system characteristics to damp an actuator.

A further object of the invention is to provide a low cost dynamically tunable positioner.

Accordingly, in accordance with one aspect of the invention, there is provided a novel positioner for controlling the position of a controlled device in accordance with an input signal, the positioner including adjustable damping means for tailoring a dynamic characteristic of the system over a wide range of controlled device characteristics.

In accordance with a further aspect of the invention, the positioner has novel motion amplifying relay means and damping means for dynamically controlling an actuator.

A feature of the invention resides in the mechanism for effectively incorporating variable spring rate means in a minor feedback loop of the positioner.

BRIEF DESCRIPTION OF THE DRAWINGS

Further objects and features of the invention will be apparent upon reading the following description in conjunction with the drawings thereof in which like reference parts are given like reference numerals and in which.

DESCRIPTION OF THE PREFERRED EMBODIMENT

Figure 1:
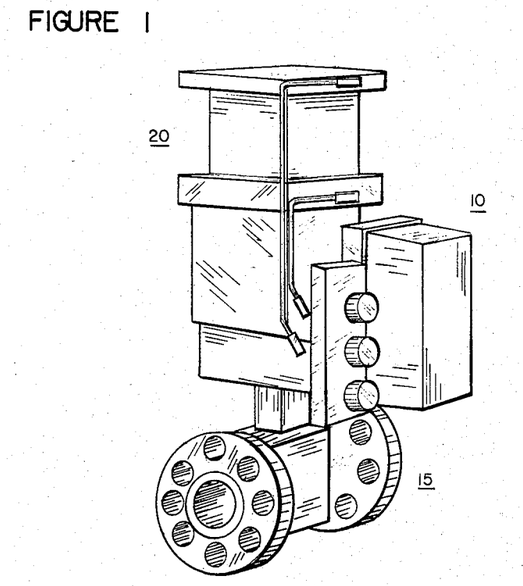
FIG. 1 depicts the positioner of the present invention mounted to an actuator for controlling a valve connectable in a pipeline.

FIG. 1 shows a positioner-actuator-controlled device arrangement wherein the positioner of the present invention, identified generally by reference numeral 10, and an actuator 20 are arranged to control a controlled device 15. Controlled device 15 comprises a fluid valve having a movable stem which is caused to assume a desired position in response to an input signal to the positioner. The valve is insertable into the pipeline by means of the flanges illustrated. The series of gauges may be used to monitor line pressure, valve stem positioning, and so forth. As is apparent to those working in the art the array of sizes and configurations of the positioner-actuator and controlled devices is enormous.

Figure 2:
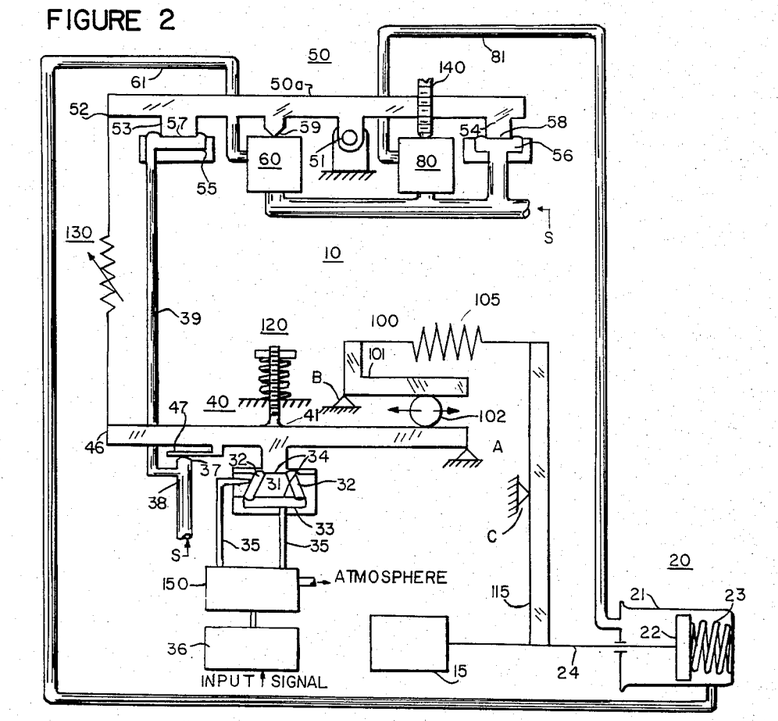
FIG. 2 is a simplified schematic diagram of a positioner constructed in accordance with the teachings of the invention.

FIG. 2 depicts a schematic representation of a positioner system operating in accordance with the teachings of the invention. An input module 30 is provided for translating input signals into mechanical forces on a summing beam 40. Input module 30 includes a pair of air chambers 32 and 33 and corresponding diaphragms 34 and a vertically movable input module capsule 31 applying vertically directed forces on summing beam 40 which vary as a function of the input signal. A pair of air lines 35 respectively communicate with chambers 32 and 33 and apply air pressure as dictated by an input source 36 which functions to convert the input signal (which may be electrical) into a corresponding air pressure. Pressure applied to chambers 32 and 33 generates an appropriate force on summing beam 40 in the "up" direction. In applications requiring reverse operation, a Direct/Reverse selection switch 150 interposed between the air lines and input source 36 is switched to the reverse position, and the input air pressure is supplied only to chamber 32, switch 150 venting chambers 33 to the atmosphere. Thus, in reverse operation, the input pressure applied only to chamber 32 generates an appropriate force on summing beam 40 in the "down" direction.

The summing beam is mounted for pivotal movement about point A and has an extension forming a flapper 47 which cooperates with a nozzle 37 in a conventional manner to control the back pressure in the nozzle as a function of the position of the summing beam. Summing beam 40 also includes an extension 41 to which is mounted a static balance or zero adjustment mechanism 120. As shown, the zero adjustment mechanism applies force on the summing beam in a downward vertical direction. It will be recognized that the zero adjustment mechanism is readily reversible should the system be such that forces on the summing beam in the opposite direction are desired. The summing beam is also subjected to force indicative of the position of the control device (major feedback). This force is applied to the summing beam through a span adjustment means 100 which includes a span adjustment lever 101 mounted for pivotal movement about a point B, a span adjuster 102, and a range spring 105 coupled to a controlled device position lever 115. This lever will be seen to be connected to a movable link 24 connected to a piston in an actuator 20.

Relay means 50 include a relay beam 50a, pivotally mounted at a pivot 51 for simultaneously operating, in an alternate manner, a pair of relays 60 and 80. The relay beam includes a relay operator 59 for relay 60 and a balance pressure, or cross over, adjustment 140 for operating relay 80. Relay beam 50a also includes a pair of displaced pistons 53 and 54, one of which is responsive to command signal pressure (nozzle back pressure) and the other being responsive to supply pressure. A pair of output lines 61 and 81 couple relays 60 and 80, respectively, to the air chambers in piston type actuator 20. In particular, actuator 20 includes a housing 21, and movable piston 22 and a spring 23 urging piston 22 in a given direction. As mentioned, link 24 is connected to the piston as well as to controlled device position lever 115 and to controlled device 15. Lever 115 is pivotally mounted for movement about fixed point C and it will be apparent that placement of the pivot point will determine the mechanical advantage of the lever and hence the movement "fed back" from the actuator. The pressures on opposite sides of piston 22 will cause it to move left or right and thus move link 24 and the movable element (not shown) in controlled device 15 and the lever 115.

Returning to nozzle 37, it will be seen that a supply of air S, is provided at the bottom portion thereof through a restriction 38. As the flapper distance from the nozzle is changed the nozzle experiences a change in back pressure which will be referred to as a command signal. A command signal line 39 communicates the change in nozzle pressure to a command chamber 55 in relay means 50. A diaphragm 57 is provided across this chamber and is in communication with command piston 53 on relay beam 50a. A supply piston 54 is located at the opposite end of the relay beam and communicates with a diaphragm 58 across a supply chamber 56 which, along with relays 60 and 80 are fed from air supply S. Lastly, 52 and 46 indicate brackets on the end of the relay beam and summing beam respectively, which serve to mount an adjustable damping means 130, depicted in the diagram as a variable rate spring.

Operation of the positioner is fairly straightforward. Assume that the input signal results in a pressure change in chambers 32 and 33 such that the force generated on input module 31 is upward. Diaphragms 34 allow input module capsule 31 to move vertically upward and apply a corresponding force to summing beam 40. Summing beam 40 will move clockwise about pivot A and increase the distance between flapper 47 and nozzle 37, resulting in a reduction in back pressure because of restrictor 38. This command signal is communicated via command line 39 to command chamber 55 resulting in a relative decrease in pressure in command chamber 55 with respect to supply line pressure in supply chamber 56. Relay beam 50a moves counterclockwise about pivot 51, opening relay 60 to supply pressure and opening relay 80 to exhaust. Output line 81 experiences a decrease in pressure and output line 61 experiences an increase in pressure which causes piston 22 in actuator 20 to move toward the left. The movable element in controlled device 15 is moved by link 24 and its position is communicated via position lever 115 back to the summing beam through the span adjuster mechanism, namely range spring 105, span adjustment lever 101, roller 102 and span adjuster bolt 110. Movement of lever 115 stretches range spring 105 and increases the load on the summing beam. The resultant of all forces on the summing beam tend to return it to its normal equilibrium position. Equilibrium is reached with the back pressure from nozzle 37 returning to its original value.

The ratio, or gain, from input pressure to actuator position is varied by means of the span adjuster mechanism. Movement of roller 102 to the left or the right during initial calibration by the user effectively increases or decreases, respectively, the amount of force change fed back to the summing beam by movement of link 24.

The adjustable damping means 130 acts to feedback information about the movement of the relay beam (and hence about movement of the relay plugs) to the summing beam in the form of a force opposed to the force generated responsive to the command signal. This is dynamic feedback and, as it is implemented in the invention, has substantially no effect on the static equilibrium or balance of the system. Thus the effect of damping means 130 is only experienced under conditions of change and its effect may be adjusted by the user, to suit the particular characteristics of the actuator and controlled device used with the positioner.

Figures 3, 4, 7, 8:
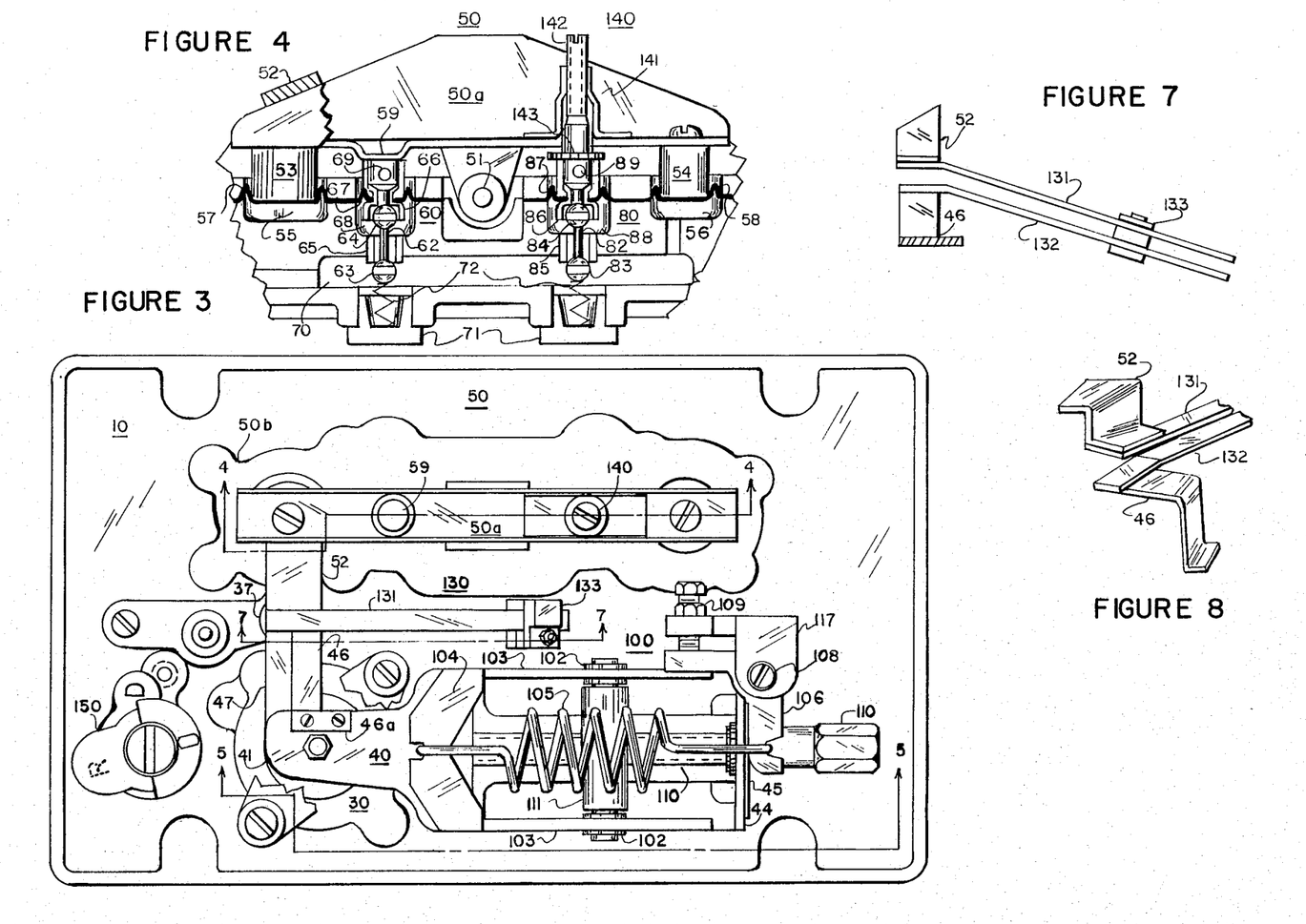
FIG. 3 is a simplified, partially broken away plan view of the positioner of FIG. 1.
FIG. 4 is a partial elevation of novel relay means of the positioner of FIG. 3 taken along the line 4—4.
FIG. 7 is a partial view of the minor loop feedback mechanism of the positioner of FIG. 3 taken along the line 7—7.
FIG. 8 is an isometric view of a portion of the feedback mechanism of FIG. 7.

In FIG. 3 there is shown a plan view of a positioner 10 constructed in accordance with the invention. To improve clarity, portions of the structure are broken away and items such as mounting screws and bolts and the like have been omitted. An understanding of the structure may be more readily attained by reference to FIGS. 4 and 5 along with FIG. 3. Relay beam 50a is generally rectangular in the plan view of FIG. 3 but reference to FIG. 4 indicates a shape similar to that of a "roof truss". It is mounted on a pivot 51 for rocking motion about that point. A relay body 50b is indicated in outline (without mounting bolts) and houses the various chambers, pistons and relays associated with relay means 50.

Figures 5, 6, 9:
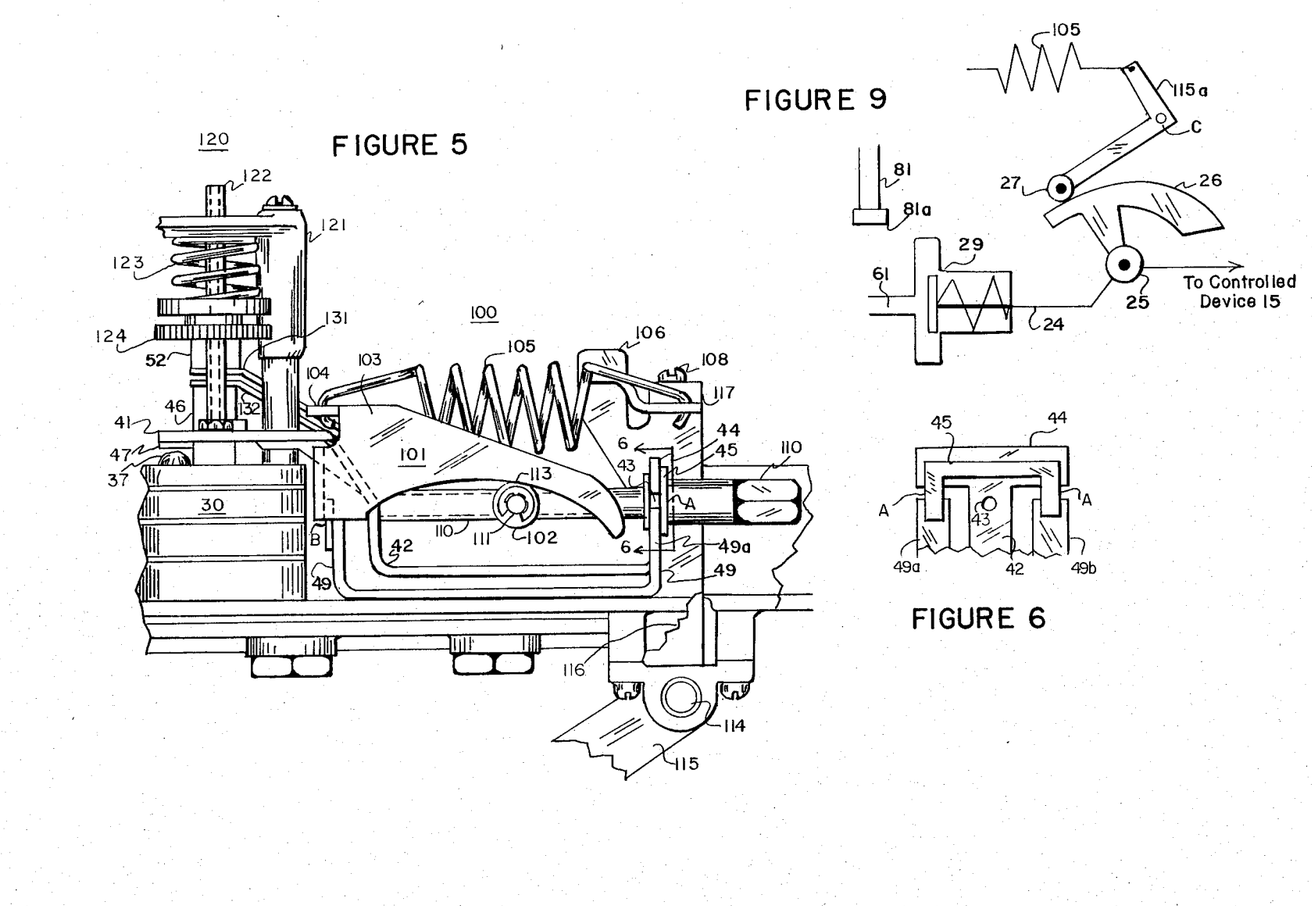
FIG. 5 is a partial elevation of a portion of the apparatus of the positioner of FIG. 3 taken along the line 5—5.
FIG. 6 is a partial end view of the apparatus of FIG. 5 taken along the line 6—6.
FIG. 9 is a schematic diagram of a different form of actuator and controlled device position lever.

The summing beam, indicated by reference numeral 40 does not occupy a single plane but, as soon more clearly in FIG. 5, has an extension 41 and an offset "U" shaped portion 42. Further reference to FIG. 6 indicates a "T" shaped support 44 formed at the outer leg of "U" shaped portion 42. Extension 41 is connected to flapper 47, which overlies nozzle 37. Variable damping mechanism 130 includes a flat spring 131, a movable clamp 133 and a pair of brackets 52 and 46 connected respectively to the ends of relay beam 50a and summing beam 40. The damping mechanism also includes another flat spring 132 underlying flat spring 131. Bracket 46 is shown as being connected by screws 46a to the extension of the summing beam. Bracket 52 may be similarly connected to the relay beam.

Relays 60 and 80 underlie relay actuator 59 and pressure balance adjustment 140 as is clearly illustrated in FIG. 4. Relay means 50 include a pair of identical relays 60 and 80 operated in a "push pull" manner by the rocking or pivoting of relay beam 50a about pivot 51 in response to differential forces on the supply and command pistons 54 and 53, respectively. Each relay has a movable valve stem, at each end of which is a spherically shaped valve plug in an arrangement similar to a "dumbbell". Each relay also has a fixed input valve seat and a movable exhaust valve seat, the latter being attached to and movable with a diaphragm. As the beam rocks, it lifts the exhaust seat of one relay, allowing its output chamber pressure to drop to atmospheric pressure, and opens the input seat of the other relay, allowing the pressure in its output chamber to rise to that of the supply. Since the exhaust chambers are connected to different sides of the actuator piston, these pressure changes result in movement of the piston and of the controlled device.

Specifically relay 60 includes a valve stem 62 having input and exhaust plugs 63 and 64, respectively, attached to opposite ends thereof. Its counterpart relay 80 includes a valve stem 82, input plug 83 and exhaust plug 84 similarly arranged. A supply chamber 70 communicates with input valve seats 65 and 85, which are normally closed by their respective input plugs. It is often desirable to maintain a relatively high pressure on both sides of the piston actuator for "stiffness" purposes and this may be done by keeping these input valves slightly open and allowing the pressure in both exhaust chambers to rise to that desired.

The exhaust seats 66 and 86 resemble inverted cups and are affixed to diaphragms 67 and 87, indicated as heavy lines in the drawing. The exhaust seats have upper cylindrical portions 69 and 89 that are vented to atmosphere and which are in contact with relay actuator 59 and portion 143 in the cross over adjustment mechanism 140, respectively. The valve stems are supported by lightweight springs 72 against the input plugs. A pair of seal plugs 71, threaded into the relay body, complete the assembly.

It should be noted that command piston 53 is sized to be larger than supply piston 54 to provide proper relay sensitivity for high performance. Also, the relay beam is supply biased by supply piston 54 which yields advantages in terms of system stability with variations in supply pressure.

Assuming relay beam 50a moves clockwise in response to an increase in pressure in command chamber 55, exhaust seat 66 moves away from exhaust plug 64 and allows output chamber 68 to vent to the atmosphere. Supply plug 63 and supply seat 65 remain in contact during this time, thus creating a seal at the supply seat. The pressure change in the chamber is reflected in a change in pressure on the piston in the actuator. Relay 80, on the other hand, has its valve stem moved oppositely which results in input plug 83 moving away from input seat 85 and allowing output chamber 88 to fill with air from supply chamber 70. It will be appreciated that exhaust seat 85 is moved downwardly with exhaust plug 84 during movement of stem 82 and the exhaust plug does not break to seal with the exhaust seat. The result is that the pressure to the actuator (from relay 80) is increased.

The valve plugs are spherical in shape to assist in maintaining good valve seating despite minor vertical misalignment of the stems. The relays themselves are identical, which is advantageous from a manufacturing and servicing point of view. Also, as stated earlier, the relay beam facilitates crossover adjustment. For many double acting actuators, it is common to maintain substantial pressure on both sides of the piston—often 60 to 80% of the supply pressure—to provide a stiff actuator and a quick response. This adjustment is readily made with the beam relay and the amount of leakage across the input seats in the rest or static position may be accurately controlled.

Another extremely important feature is the relay beam itself, which not only enables the desired motion amplification for the negative feedback loop, but also makes for very easy access to movement of the relay plug. With the relay beam of the invention minor loop feedback is simple and straightforward to incorporate.

With particular reference to FIG. 3 and FIG. 5, span adjustment means 100 are illustrated. Span adjustment lever 101 includes a pair of "claw shaped" adjustment arms 103 connected by a yoke 104. Controlled device position lever 115 is pivotally mounted to the positioner housing at 114 and extends upwardly, as viewed through broken away section 116, terminating in a bent over flange 117 supporting a fine adjustment screw 109. Screw 109 cooperates with an "L" shaped adjustment lever 106 pivotally mounted on a shoulder screw 108 in flange 117. Adjustment of screw 109 to move adjustment arm 106 counterclockwise stretches range spring 105, increasing the load on adjustment arm 103 (through yoke 104). A "U" shaped mounting bracker 49 supports the "yoke end" of the span adjustment lever via a flat spring flexure, thus establishing pivot point B. Each of the adjustment arms 103 includes a contoured surface 113 which bears against a roller 102 affixed to the end of a shaft 111 which includes a threaded central aperture.

A complementarily threaded adjustment bolt 110 engages the threads in the aperture for moving shaft 111 along bolt 110. Contoured surfaces 113 thereby determine the degree of tilt or angular displacement about point B which, of course, affects the force applied to the summing beam. The contoured surfaces have been shaped to minimize the amount of zero shift or change in static equilibrium that occurs during initial calibration as a result of moving roller 102 to the left or the right. It should be noted that span adjustment bolt 110 is connected between the legs of the "U" shaped portion of the summing beam.

Extension 41 of the summing beam includes flapper 47 on its underside positioned over nozzle 37. The zero adjustment means 120 shown differ from those illustrated in the schematic diagram (they act to apply downward force on the summing beam as shown) and include an upstanding support 121, a threaded shaft 122, a load spring 123, and a knurled adjustment knob 124 for varying the force on extension 41 of the summing beam for zero adjustment purposes. Summing beam extension 41 overlies input module 30.

Referring to FIG. 6, the "T" support 44 for the summing beam is tack welded to a generally "U" shaped flat spring 45, the legs of the spring beam being tack welded to leg extensions 49a and 49b of the support bracket 49 and forming pivot A. Span adjustment bolt 110 has a necked down portion which passes through an aperture 43 in the outer leg 42 of the summing beam with the result that the summing beam is mounted for pivotal movement about point A. As the summing beam moves, the span adjustment bolt is carried with it.

FIG. 7 illustrates the adjustable damping means of the invention. It may be well to also refer to FIG. 8, which is an isometric view of the mechanism, since it may be difficult to visualize the configuration of brackets 52 and 46. Bracket 52 connects to an arm of the relay beam and bracket 46 is connected to extension 41 of the summing beam. It should be pointed out again that the relay beam provides a very convenient mechanism to obtain "motion amplification" for the adjustable damping means in the minor feedback loop. A pair of flat springs 131 and 132 is connected to appropriate flanges on brackets 52 and 46, respectively, and extend in parallel relationship to each other. An adjustable clamp 133 is slidable along the parallel springs and may be tightened at any point along their length. Movement of clamp 133 towards brackets 46 and 52 effectively "stiffens" the connection between relay beam 50a and summing beam 40. Under this condition, movements of the relay beam are translated into large damping forces on the summing beam. Movement of clamp 133 in the opposite direction lengthens the spring and movement of the relay beam has less damping effect on the summing beam. It should be borne in mind that these forces are not static but dynamic in nature. At rest or equilibrium the damping mechanism applies insignificant force to the summing beam. In effect elements 131, 132 and 133 function as a variable rate spring with the user being able to adjust the spring rate.

Since the clamp is user-adjustable and, since the attitude of the springs permits movement of the clamp without upsetting the static balance of the positioner, the user can thus "tailor" or "fine tune" the positioner for optimum performance with the actuator. Consequently the system of the invention may truly be optimized for the particular requirements of the user apparatus and at no cost penalty. Indeed with the movement amplifying aspect of the relay beam and the ease with which the relay beam enables access for connection of the damping means, the overall positioner presents impressive cost advantages and conveniences over the prior art.

In FIG. 9, a single-acting spring loaded diaphragm type actuator 29 is shown to which a single output line 61 is coupled. Link 24 is connected to a mechanism for rotating a movable element (not shown) in controlled device 15. This may, for example, consist of a rotary type valve stem as distinct from a vertically movable stem. A cam 26 is coupled to the rotary element and is contoured such that its angular movement is communicated via a roller 27 affixed to the end of position lever 115a which in turn is coupled to range spring 105. The other output line 81 (from the relay means) is capped at 81a indicating that only one of the relays is needed in this type system. In substantially all other respects the system operates identically to that described. There are, of course, many types of actuators and controlled mechanisms extant. This schematic merely points out the invention is not confined to any particular type of actuator, i.e. piston/diaphragm, direct-acting or reverse-acting. Obviously, the type of controlled device is immaterial to the invention.

The described invention has been shown to provide a positioner with adjustable damping that does not affect static equilibrium (zero calibration). With it, the user can tailor or fine tune his positioner-actuator arrangement for optimum performance. It should also be noted that the novel relay mechanism incorporated enables ready achievement of motion amplification for supplying the damping in a minor feedback loop from the relay means to the summing means. The simplicity and ease with which the minor loop feedback may be added to a positioner incorporating the instant relay beam is of great value to the manufacturer. Further, the relay means incorporated enable the static pressure on the actuator diaphragm or piston to be readily adjusted and set to ensure good actuator "stiffness" while obtaining full advantage of the damping characteristics of the invention for obtaining optimum system response time.

While a particular embodiment of the present invention has been shown and described, it will be apparent to those skilled in the art that various changes and modifications may be made without departing from the invention in its broader aspects. Accordingly, the aim in the appended claims is to cover all such changes and modifications which may fall within the true spirit and scope of the invention.

What is claimed is:

1. A positioner system for controlling the position of a controlled device in accordance with an input signal comprising:
   output means for controlling the position of said controlled device;
   summing means for integrating said input signal with a signal representative of the position of said controlled device and for producing a command signal for said output means;
   adjustable damping means including user-adjustable variable rate spring means for tailoring the dynamic overshoot characteristic of said system to accommodate a wide range of controlled devices;
   said variable rate spring means affecting said overshoot characteristic without substantially affecting static characteristics of said system;
   said variable rate spring means comprising a pair of spring members, each having one end coupled to a respective one of said output means and said summing means; and
   a movable clamp for simultaneously changing the effective lengths of said spring members to alter the damping effect on said summing means.

2. A pneumatic positioner system for driving an actuator for controlling the position of a valve stem in accordance with an input signal comprising:
   summing means for integrating a plurality of forces applied thereto and producing a command signal as a function thereof;
   relay means responsive to said command signal for driving said actuator;
   means translating and applying said input signal as a force to said summing means;
   means coupling said command signal to said relay means;
   means applying a force to said summing means as a function of the position of said valve stem; and
   variable damping means including a spring member having an adjustable spring rate coupled between said relay means and said summing means for applying damping forces to said summing means.

3. The system of claim 2 wherein said relay means include motion amplifying means for applying said damping force.

4. A positioner for controlling the mechanical position of a controlled device in response to an input signal comprising:
   summing means for integrating a plurality of forces and for generating a command signal as a function thereof;
   means translating said input signal into an input force on said summing means;
   relay means for controlling the position of said controlled device in response to said command signal, said relay means including motion amplifying means comprising a pivotally mounted relay beam;
   means applying a force to said summing means indicative of the position of said controlled device; and
   variable damping means including a flexible flat spring member for applying a force to said summing means from said pivotally mounted relay beam for damping movement of said summing means, said flat spring member having an adjustable spring rate.

5. The positioner of claim 4 wherein said flat spring is removably attached to said summing means and to said relay beam to enable ready change in damping effect.

6. A system for controlling the mechanical position of a controlled device in response to an input signal, comprising:
   a summing beam for integrating a plurality of forces and for producing a command signal as a function of said integration;
   relay means, including motion amplifying means, for controlling the position of said controlled device in response to said command signal;
   means applying a force to said summing beam indicative of the position of said controlled device;
   means converting said input signal into an input force and for applying said input force to said summing beam; and
   adjustable damping means for applying a force to said summing beam from said motion amplifying means for dynamically controlling movement of said controlled device, said adjustable damping means comprising a variable rate spring that is user-adjustable and adjustment of which has substantially no effect on the static characteristics of the system.

7. The system of claim 6 wherein said motion amplifying means comprise a relay beam, and wherein said relay means further include a pair of relays operable by said relay beam.

8. The system of claim 7 wherein said variable rate spring comprises;
   a pair of flat springs each having one end coupled to said summing beam and to said relay beam, respectively; and
   a movable clamp for simultaneously changing the effective lengths of said flat springs.

9. The system of claim 8 further including;
   actuator means having an output coupled to said controlled device and an input coupled to said relay means; and
   wherein the output of said actuator means supplies said force indicative of the position of said controlled device to said summing beam.

10. The system of claim 9 wherein said relay beam is mounted on a pivot for pivotal movement between said relays, the connection to said one of said flat springs to said relay beam being at a greater distance from said pivot than the distance to said relays to provide a mechanical gain.

11. The system of claim 10 wherein said relays are mechanically operated by said relay beam, further including;
   adjustment means for one of said relays carried by said relay beam for adjusting the force applied to said actuator means when said system is in equilibrium.

12. A pneumatic positioner-actuator system for controlling the position of a valve stem as a function of an input signal comprising:
   a summing beam for integrating a plurality of forces applied thereto and for producing a pneumatic command signal as a function of said integration;
   relay means including a pair of relays controlled by a pivotally mounted relay beam;
   an actuator connected to said valve stem and being under control of said relays;
   a positioner lever applying a force on said summing beam indicative of the position of said position lever;
   means supplying said pneumatic signal to said relay beam;
   adjustable damping means connected between one arm of said relay beam and said summing beam for damping movement of said beam, said adjustable damping means comprising a user-adjustable device having substantially no effect on the static characteristics of the system; and
   said adjustable damping means including a pair of flat springs, each having one end connected to one of said relay beam arm and said summing beam, respectively, and a movable clamp slidable along the length thereof, said springs being oriented in parallel.

* * * * *

UNITED STATES PATENT AND TRADEMARK OFFICE
CERTIFICATE OF CORRECTION

PATENT NO. : 4,509,403

DATED : April 9, 1985

INVENTOR(S) : George W. Gassman; Gerald F. Varnum

It is certified that error appears in the above-identified patent and that said Letters Patent is hereby corrected as shown below:

Column 3, line 67, "into the pipeline" should be --in a pipeline--;
Claim 12, line 18, "pneumatic signal" should be --pneumatic command signal--;
Column 6, line 20, "as soon more" should be --as seen more--;
Column 7, line 63, "bracker 49" should be --bracket 49--;
Column 7, line 28, "to" should be --its--.

Signed and Sealed this

Twenty-ninth Day of October 1985

[SEAL]

Attest:

DONALD J. QUIGG

Attesting Officer

Commissioner of Patents and Trademarks—Designate